United States Patent [19]

Nadudvari et al.

[11] Patent Number: 4,675,103

[45] Date of Patent: Jun. 23, 1987

[54] FILM-FLOW PACKING FOR BIOLOGICAL TREATMENT OF FLUIDS

[75] Inventors: Joszef Nadudvari; Laszlo Ragacs, both of Szentes, Hungary

[73] Assignee: Hungaria Muanyagfeldolgozo Vallalat, Budapest, Hungary

[21] Appl. No.: 811,095

[22] Filed: Dec. 19, 1985

[51] Int. Cl.[4] ............................................. C02F 3/10
[52] U.S. Cl. .................................. 210/150; 261/112; 261/DIG. 72
[58] Field of Search ...................... 210/615, 150, 151; 261/112, DIG. 72

[56] References Cited

U.S. PATENT DOCUMENTS

| | | |
|---|---|---|
| 3,618,778 | 11/1971 | Benton et al. ...................... 210/150 |
| 3,904,525 | 9/1975 | Rosenberg ........................... 210/150 |
| 4,385,012 | 5/1983 | Priestley ............................... 210/150 |

FOREIGN PATENT DOCUMENTS

| | | | |
|---|---|---|---|
| 209309 | 12/1956 | Australia ............................. 210/150 |
| 2746280 | 4/1978 | Fed. Rep. of Germany ...... 210/150 |
| 132191 | 9/1978 | Fed. Rep. of Germany ...... 210/150 |
| 2035284 | 5/1980 | United Kingdom ................ 210/150 |

*Primary Examiner*—Benoit Castel
*Attorney, Agent, or Firm*—Karl F. Ross; Herbert Dubno

[57] ABSTRACT

The invention relates to plastic packing for biological treatment of fluids, comprising a series of plates packed without the use of adhesive, provided with convex and concave ribs wherein inclined channels with corrugated side-walls are arranged between the adjacent sheets. The sheets are formed by M-profiles, the joining lines and centerlines of the M-profiles are unbroken in the full height of the packing and are at a maximum 30° to the vertical, furthermore the corrugated parts are ribbed surfaces formed only on the shanks of the M-profiles, so that a flat strip without ribs is on both sides of the joining lines of the profiles. According to one of the versions, the plastic sheets are joined opposite each other, so that the shanks of M-profiles end in a point of junction. According to another version, the sheets are turned in the same direction, joined and spaced at a distance of ½ M-profile, so that the shanks of M-profiles on one sheet lie in a trough on the upper part of the M-profiles on the adjacent sheet.

16 Claims, 7 Drawing Figures

FILM-FLOW PACKING FOR BIOLOGICAL TREATMENT OF FLUIDS

FIELD OF THE INVENTION

The invention relates to film-flow packing treatment of fluids, comprising a series of plates provided with concave and convex ribs, whereby inclined channels with corrugated sides are formed an angle between the adjacent plates packed together.

BACKGROUND OF THE INVENTION

As known the quality of water depends on its physical, chemical and biological properties. Preservation of water quality and adequate purification of sewage effluent has become a central problem of environmental protection in recent years.

The various technologies of the water and sewage purification include physical, chemical and biological processes. In a version of the biological processes so-called drip bodies are used as the primary purification phase of mainly multiphase sewage water purification technologies. Their application permits active sludge biological purification technology to be carried out at higher efficiency.

The packing of the biological drip bodies can consist of various materials although nearly exclusively plastic packings are used today. The packings are arranged on top of one another, built up as tower or column to form the drip bodies, a water distributor being provided at the top of the column.

According to the principle of operation of the biological drip bodies the waste or sewage water flows down intermittently or continuously along the bilogical film developing on the surface of packings. This brings about coagulation and absorption of the pollutant, in the course of which the microorganic culture forming the biological film dissolves solutes of water to be for deriving energy and cell synthesis. The overmultiplied biological film fractions agglomerate in a sedimentator, the cell-free enzyme activity of the microorganisms being decomposed to materials which diffuse through the cell wall and thus participlate in the metabolism process.

The oxygen required for biochemical oxidation is supplied by the air passing through the packing. Flowing down in the drip body the $BOD_5$ value of the waste waters diminishes exponentially.

Thus the packings used in the biological drip bodies must meet several requirements:

The surface area related to unit volume of the packings covered by the biological film has to be as large as possible. At the same time the void volume also must be large in the packing to have sufficient free cross section for the filmy downflow of the waste water and adequate oxygen supply should be available.

In addition, the packing must be resistant to chemical, biological and physical effects and must possess adequate static strength in order to be able to carry the weight of water, the biological film and several packing units arranged on each other.

Further obvious requirements are the easy, simple and fast production of the packings, as well as their fast and simple assembly in columns, operation and maintenance.

One of the most familiar attempts to provided such packings is described in the U.K. patent documents Nos. 1 065 612 and 1 080 991. The elements are plastic sheets with straight or curved generatrix and accordion-like corrugated surfaces. These are generally arranged alternately with flat sheets so that the elements are turned opposite each other.

The fundamental shortcoming of the construction is that as a result of using flat sheets to increase the mechanical strength, the specific surface is relatively small 85 $m^2/m^3$ which results in poor efficiency.

This technique is also used where the packing consists of sheets corrugated in strips and the sheets are provided with reticular reinforcing elements on the top and bottom. There is no closed channel system and though its specific surface is larger than that of the earlier mentioned solutions, the mechanical loadability of the packing is low.

In the German Federal Republic Patent No. 1 299 665 a packing is described, which consists similarly of sheets folded as an accordion. Corrugations of the adjacent sheets intersect each other and the sheets are made of a moisture absorbing material. The specific surface of the elements is relaively small, the mechanical strength is low, and they are unsuitable for use in biological drip bodies.

It is also known (German Democratic Republic Patent No. 58 104) which consists of trapezoid corrugated sheets. Flat sheets are arranged between corrugated sheets with oblong slots on the corrugated sheets. The specific surface is small, mechanical strength is poor, field of application is mainly contact of liquid and gas.

The plastic packing described in the Hungarian Patent No. 172 169 represents definite progress compared to the earlier systems. This packing is provided with corrugated through channels separated from each other, where the channels are regular hexagon cross sections in any horizontal section of at least one part of the packing. The longitudinal axes of the channels in the vertical plane consist of opposite sections following each other at least in part, and preferably two adjacent sides of each channel are provided with corrugations in cross direction to the longitudinal axis.

This construction enables an increase in the specific surface to 135 $m^2/m^3$ and yields very good results. However it has two fundamental drawbacks: the sheets forming the packing are assembled with the use of adhesive. This is expensive, for it requires filler material and further aids; the gluing technology entails the risk of accident, since the applied solvents are poisonous and represent gas and explosion hazard.

A further drawback is that the longitudinal axes of the channels are at a relatively large angle to the vertical (30°–50°). Thus—as a result of gravity—the water tends to flow on the lower part of the channels during operation. This means that mainly in case of heavy surface load the surface participating in intensive purification may be reduced to 50% of the total surface. Hence operation of these packing units is flexible against change of load only in a relatively narrow range.

Clogging, inundation or other failures of the packing requiring repair, maintenance frequently occur even during the most careful operation of the biological drip bodies. Jointing the sheets with adhesive is unfavorable in this respect too, for the sheets cannot be separately replaced, and cleaning or maintenance are difficult.

OBJECT OF THE INVENTION

It is an object of the present invention to eliminate of the described deficiencies and provide a plastic packing capable of being exposed to heavy load particularly for biological drip bodies, the production, assembly, repair and maintenance of which are inexpensive, fast and simple, and which has a large specific surface for more efficient and economical operation.

SUMMARY OF THE INVENTION

Therefore, the sheets of the packing according to the present invention are formed with M-profiles provided with regularly repetetive convex and concave sheets joined to each other without the use of adhesive, with channels with corrugated side-walls arranged at an angle, the joining lines and centerlines of the M-profiles being unbroken in the full height of the packing and at a maximum of 30° to the vertical, the corrugated parts being ribbed surfaces formed only on the shanks of the M-profiles so that flat strips without ribs are on both sides of the joining line of the profiles.

In the packing according to the invention the sheets are joined without adhesive. The M-profiles may be flat or curved surfaces.

The joining lines and centerlines of the M-profiles are preferably at an angle of 5° to the vertical in a practical construction.

The ribbed surface is formed preferably by M-profiles and alternately M and V-profiles, where the joining lines and centerlines of the profiles consisting of flat sheets are horizontal.

In given case the profiles may be rounded at their tips and joints of the shanks. The tips and shanks are preferably at an angle of approximately 90°.

The length of the upper branches of the M-profiles forming the sheets is 1-200 mm, preferably 2 mm. Width of the flat strips at their edges is similarly 1-200 mm, preferably 3 mm. The length of the profile shanks is 10-200 mm, preferably 25 mm.

The height of the M and/or V-profiles forming the ribbed surfaces is 2-16 mm, preferably 5 mm. The angle between the profile shanks is preferably 60°.

The length and width of the sheets forming the packing are preferably 500-3000 mm, size of the sheets in a practial construction is 500×1000 mm.

According to a version of the invention the sheets forming the packing are joined opposite each other so that shanks of the M-profiles end in a point of junction. According to another version the sheets are turned in the same direction, spaced and joined to each other at a distance of ½M-profile so that the shanks of M-profiles on one sheet fit into the trough on the upper part of M-profiles on the adjacent sheet.

The plastic sheets forming the packing may be made of polyethylene, polystyrene, polypropylene, polyvinylchloride or hard polyethylene foil by vacuum molding.

The fundamental advantage of the plastic packing according to the invention is that its specific surface can be increased even to 500 m²/m³, which is a multiple of the earlier best solution. Its operation is flexible even under high hydraulic, or surface load, thus the amount of charge built in for the given capacity can be reduced by 30-40%.

Two types of packing can be constructed from the uniformly shaped plastic sheets according to whether the sheets are joined by turning them in the same direction or opposite each other. The joining is a shape-retentive, thus gluing is unnecessary. At the same time in case of cleaning or failure it is easily assembled and disassembled, and each sheet can be separately replaced.

The voids volume is large and the angular deflection of the channels is small in relation to the vertical, which ensure ample and efficient air supply. Owing to the special formation of the tips, the statical strength is very good, the structure functions even under mechanical load.

The plastic sheets forming the packing according to the invention can be produced simply, quickly and in optional size, the production technology is adapted to the conventional technology.

BRIEF DESCRIPTION OF THE DRAWING

Further details of the invention are described by way of examples with the aid of drawing, in which.

SPECIFIC DESCRIPTION

Figure 1:
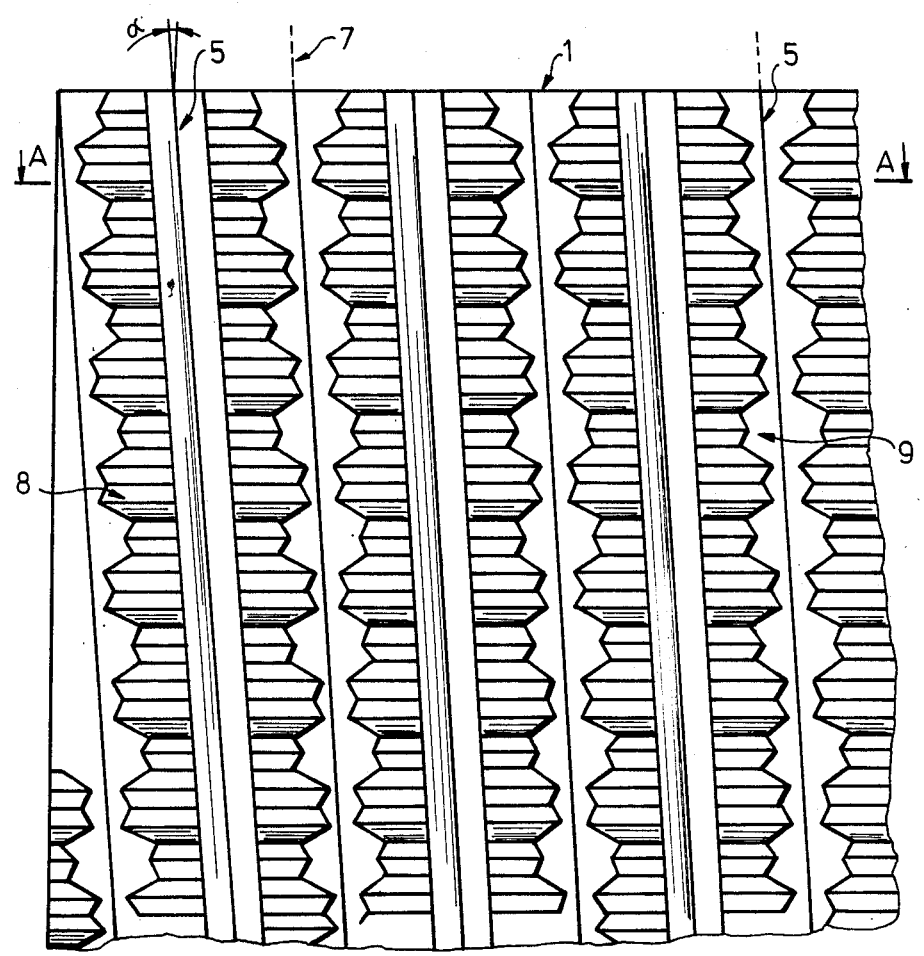
FIG. 1 is a side view of the plastic sheets forming the packing according to the invention.
Figure 2:
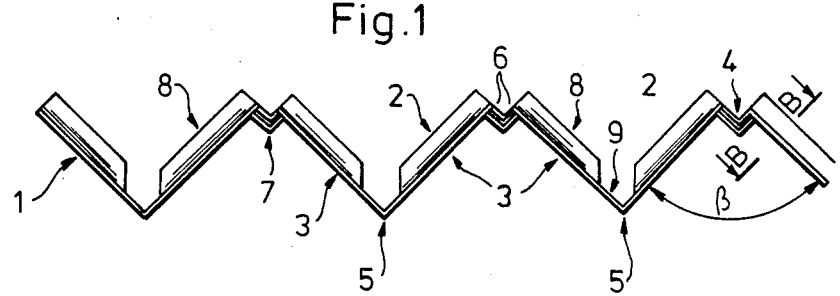
FIG. 2 is a section taken along line A—A of FIG. 1.

As shown in FIGS. 1 and 2 sheet 1 is assembled with M-profiles 2, so that shanks 3 join each other along line 5. The jointing lines 5 of M-profiles 2 and centrelines 7 at the junctions of the upper branches 6 are at an angle $\alpha$ to the vertical. In this case $\alpha=5°$. Length of the shanks 3 of M-profiles is 25 mm, length of the upper branches 6 is 5 mm. The angle $\beta$ between shanks 3 is 90°.

Figure 3:
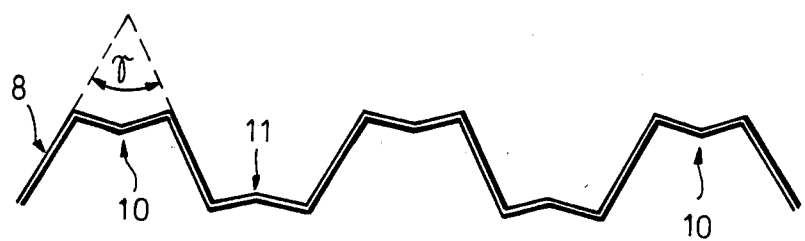
FIG. 3 is a section taken along line B—B of in FIG. 2.

Shanks 3 of M-profiles 2 are provided with ribbed surfaces 8. The ribbed surfaces 8 do not take up the full length of shanks 3, thus flat strips 9 without ribs adjoin each line 5. The minimum width of each flat strip 9 is 5 mm. FIG. 3 shows section B—B of the ribbed surface 8. The ribbed surface is formed by alternately joined M-profiles 10 and V-profiles 11 or corrugations, so that the M-profiles 10 and V-profiles 11 are turned opposite each other. Height of the M-profiles is 3 mm, the angle $\gamma$ between the shanks is 60°.

Figure 4:
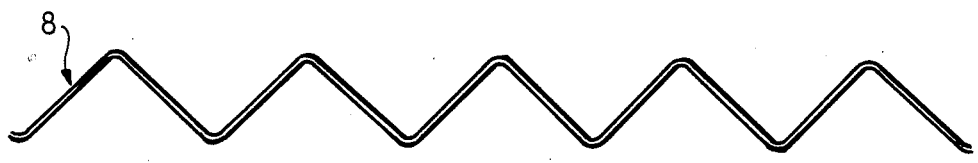
FIG. 4 is a cross section of ribs in another construction.
Figure 5:
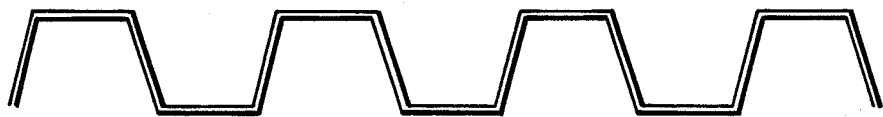
FIG. 5 is a cross section of ribs in a further construction.

Naturally the ribbed surface 8 can be formed differently too, FIG. 4 shows a solution with V-profiles turned opposite each other. FIG. 5 shows the sectional view of the ribbed surface 8 of a further possible construction, where the profile of the ribs is trapezoid. The sheets 1 can be made of a synthetic resin foil, e.g. polyethylene, polystyrene, polypropylene, polyvinylchloride, hard polyethylene, etc.

The packing according to the invention can be produced with sheets 1 in several versions.

Figure 6:
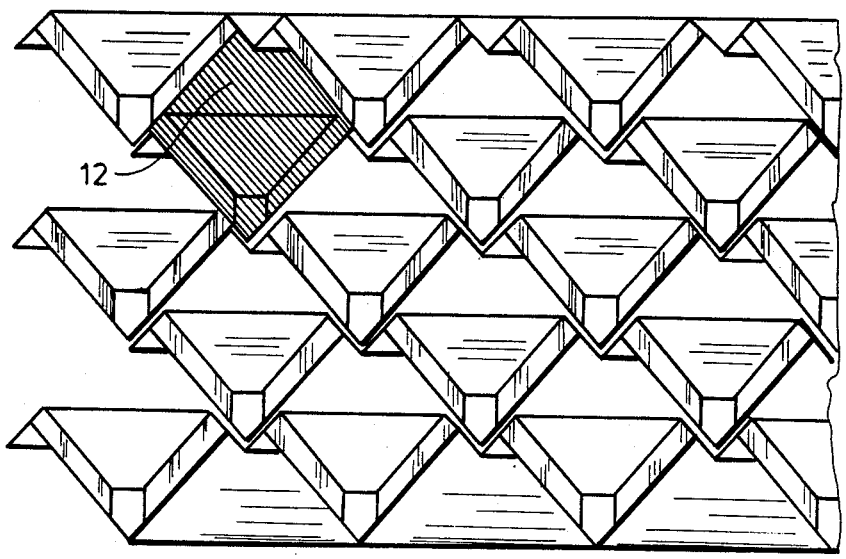
FIG. 6 is a top view of an alternative packings assembled with sheets.

In the solution shown in FIG. 6 sheets 1 are turned in the same direction, and jointed to each other spaced at half distance of the M-profile. This way the angle between shanks 3 is the same as the angle between upper branches 6, thus shanks 3 of one sheet 1 fit into troughs 4 formed by the upper branches 6 of an adjacent sheet 1.

Channels 12 of square or rhomboidal cross section are provided in the packing of closed section. Only trough 4 formed by upper branches 6 of M-profiles 2 is missing from the full square or rhomboidal cross section.

The surface per unit volume of the packing of closed section shown in FIG. 6 is very large, it may reach even 500 m²/m³.

Figure 7:
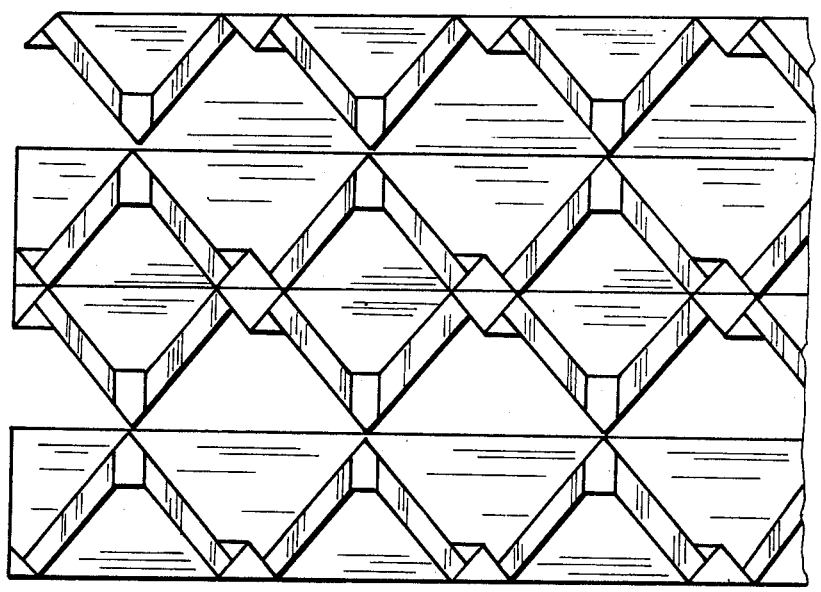
FIG. 7 is a top view of a further version of the packing.

The version shown in FIG. 7 also has relatively large specific surface, though its value is lower than that of version shown in FIG. 6. Here sheets 1 are joined opposite each other, so that the sheets of M-profiles end in a point of junction in the horizontal section.

Since in this case the joining lines 5 and centerlines 7 on the sheets 1 are opposite each other, no closed section exists in this version.

The specific surface of packings assembled with sheets as shown in FIG. 6 or 7 is several times larger than that of the conventional solution, and the relatively narrow angle of the sections and channels to the vertical results partly in high stability and partly in optimal operation. The waste water is intensively purified on both sides of the sheets under varying or impulsive surface load, consequently the construction is flexible against change of the surface load.

Flow velocity of the water on the sheets is controlled by ribbed surface 8. This surface facilitates adhesion of the biological film increases the specific surface.

Thus the packing according to the invention increases the efficiency of the biological drip bodies, while the amount of charge is reduced by 30–40% and the cost of production and operation by about 40–50%.

Although only one of the possible version is described in the example, obviously several other version can be produced based on similar principle. Variable are the sizes and shapes of M and V-profiles. The corrugated surface may differ from the illustrated one, and the tips at joint of the profiles, or within the profiles may be rounded. All these do not change the essential characteristic of the invention, namely the stable assembly and disassembly of the sheets without the use of adhesive, at the same time the cost of production and operation is reduced, while the efficiency is increased.

What we claim is:

1. A packing for the biological treatment of a fluid, comprising a plurality of sheets of a synthetic resin material horizontally abutting adjacent sheets, each of said sheets consisting of:

a plurality of substantially coplanar and identical M-section corrugations each having a pair of angularly adjoining relatively short shanks along a crest of each of said corrugations and a respective relatively long shank angularly adjoining each relatively short shank, said relatively short shanks having lengths in cross section of substantially 1 to 200 mm, said relatively long shanks having lengths in cross section of substantially 10 to 200 mm; and wherein each of said relatively long shanks angularly adjoins a relatively long shank of an adjacent M-section corrugation along a V-section trough of the sheet; said crests and troughs are inclined to the vertical and the inclination to the vertical is at a maximum of 30°;

each of said long shanks is provided with ribs transverse to the longitudinal dimension of the respective crest and extending from the respective crest toward but terminating short of the end of the respective relatively long shank at its trough so that along a joining line of each relatively long shank with an adjoining relatively long shank a respective rib-free flat surface is formed on each relatively long shank said flat surfaces having widths of substantially 1 to 200 mm; and said crests and troughs of said corrugations extend substantially the full heights of the respective sheets, said ribs having heights of substantially 2 to 16 mm.

2. The packing defined in claim 1 wherein said adjacent sheets are adhesivelessly connected together.

3. The packing defined in claim 1 wherein said adjoining lines and center line of said crests form angles of 5° with the vertical.

4. The packing defined in claim 1 wherein the ribs of each of relatively long shanks are generally of M-shape cross section.

5. The packing defined in claim 1 wherein the ribs of each of relatively long shanks are generally of V-shape cross section.

6. The packing defined in claim 1 wherein vertices at which said shanks angularly adjoin are rounded.

7. The packing defined in claim 1 wherein said angularly adjoining shanks adjoin at an angle of substantially 90°.

8. The packing defined in claim 1 wherein said lengths of said relatively short shanks are about 2 mm.

9. The packing defined in claim 1 wherein said lengths of said relatively long shanks is about 25 mm.

10. The packing defined in claim 1 wherein sid widths are about 3 mm.

11. The packing defined in claim 1 wherein said heights are about 5 mm.

12. The packing defined in claim 1 wherein said ribs have flanks including angles of about 60° with one another.

13. The packing defined in claim 1 wherein said sheets are rectangular and have lengths and widths of substantially 500 to 3,000 mm.

14. The packing defined in claim 13 wherein each of said sheets has dimensions of substantially 500×1000 mm.

15. The packing defined in claim 1 wherein said sheets are turned in the same direction so that troughs of one sheet extend into crests of an adjacent sheet.

16. The packing defined in claim 1 wherein adjacent sheets are turned in opposite directions so that troughs of one sheet abut troughs of an adjacent sheet.

* * * * *